(12) United States Patent
Koh

(10) Patent No.: US 12,539,833 B2
(45) Date of Patent: Feb. 3, 2026

(54) DEVICE FOR CHANGING BRAKING MODE AND METHOD OF CHANGING BRAKING MODE

(71) Applicants: HYUNDAI MOTOR COMPANY, Seoul (KR); KIA CORPORATION, Seoul (KR)

(72) Inventor: Sang Bum Koh, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 133 days.

(21) Appl. No.: 18/504,433

(22) Filed: Nov. 8, 2023

(65) Prior Publication Data
US 2025/0050847 A1    Feb. 13, 2025

(30) Foreign Application Priority Data

Aug. 9, 2023    (KR) .................. 10-2023-0104152

(51) Int. Cl.
| | | |
|---|---|---|
| *B60T 8/17* | (2006.01) | |
| *B60Q 9/00* | (2006.01) | |
| *B60T 8/172* | (2006.01) | |
| *B60T 13/74* | (2006.01) | |
| *B60Q 5/00* | (2006.01) | |

(Continued)

(52) U.S. Cl.
CPC ............... *B60T 8/172* (2013.01); *B60Q 9/00* (2013.01); *B60T 13/746* (2013.01); *B60Q 5/005* (2013.01); *B60T 2210/20* (2013.01); *B60T 2220/04* (2013.01); *B60T 2250/00* (2013.01); *B60T 2250/04* (2013.01); *F16D 65/18* (2013.01); *F16D 2127/02* (2013.01)

(58) Field of Classification Search
CPC ................. B60W 50/16; B60K 26/021; B60K 2026/022; B60T 7/04; B60T 7/042; B60T 7/06
See application file for complete search history.

(56) References Cited

U.S. PATENT DOCUMENTS 5,333,706 A  *  8/1994  Mori .................... B60T 13/741
                                                       188/161
2012/0143439 A1    6/2012  Kim et al.
(Continued)

FOREIGN PATENT DOCUMENTS

| CN | 110065482 | 7/2019 | |
|---|---|---|---|
| DE | 102016220385 A1 * | 4/2018 | ............ B60T 17/221 |

(Continued)

*Primary Examiner* — Logan M Kraft
*Assistant Examiner* — Joshua Campbell
(74) *Attorney, Agent, or Firm* — Fish & Richardson P.C.

(57) ABSTRACT

A device for changing a braking mode provided in a vehicle including a plurality of braking modes includes a receiving unit configured to receive vehicle state information, a condition determination unit configured to determine whether conditions for preparation of changing the braking mode and conditions for changing the braking mode are satisfied, based on the vehicle state information, an electromechanical braking (EMB) device configured to generate braking force on a vehicle, and a braking mode changing unit configured to change a braking mode based on the determination of the condition determination unit, where, when the braking mode is changed, the braking mode changing unit generates vibrations using the EMB device.

19 Claims, 6 Drawing Sheets

(51) Int. Cl.
*F16D 65/18* (2006.01)
*F16D 127/02* (2012.01)

(56) References Cited

U.S. PATENT DOCUMENTS

2020/0017123 A1     1/2020   Aizawa et al.
2023/0391299 A1*   12/2023   Komatsu ................. B60T 8/172

FOREIGN PATENT DOCUMENTS

| GB | 2277968 | A | * | 11/1994 | ........... F16D 65/092 |
| JP | 2004050905 | A | * | 2/2004 | |
| JP | 2017100507 | A | * | 6/2017 | |
| JP | 2022-130114 | | | 9/2022 | |
| KR | 10-2012-0062491 | | | 6/2012 | |
| WO | WO-2022181329 | A1 | * | 9/2022 | ............ B60T 13/662 |

* cited by examiner

DEVICE FOR CHANGING BRAKING MODE AND METHOD OF CHANGING BRAKING MODE

CROSS-REFERENCE TO RELATED APPLICATIONS

This application claims benefit of priority to Korean Patent Application No. 10-2023-0104152 filed on Aug. 9, 2023 in the Korean Intellectual Property Office, the disclosure of which is incorporated herein by reference in its entirety.

TECHNICAL FIELD

The present disclosure relates to a device for changing a braking mode and a method of changing a braking mode.

BACKGROUND

A braking system is essential for controlling the speed and safety of a moving vehicle, as it play a pivotal role in reducing speed and halting the vehicle. It accomplishes this by converting rotational energy of wheels and tires into heat energy through friction.

Modern emphasis on driving comfort has led to a diversification of braking modes within vehicles. Consequently, numerous braking modes, each capable of generating distinct braking forces, are now integrated into the vehicles.

For example, users switch between these braking modes either through a physical button or by navigating a user selection menu displayed on a touchscreen.

The conventional method for adjusting braking modes involves users accessing the touchscreen's menu or manually operating a physical button associated with the driving mode, which can be inconvenient.

SUMMARY

The present disclosure is directed to a device for changing a braking mode using a brake pedal and a method of changing a braking mode.

According to one aspect of the subject matter described in this application, a device for changing a braking mode provided in a vehicle including a plurality of braking modes includes a receiving unit configured to receive vehicle state information; a condition determination unit configured to determine whether conditions for preparation of changing the braking mode and conditions for changing the braking mode are satisfied, based on the vehicle state information; an electromechanical braking (EMB) device configured to generate braking force on a vehicle; and a braking mode changing unit configured to change a braking mode based on the determination of the condition determination unit, wherein, when the braking mode is changed, the braking mode changing unit generates vibrations using the EMB device.

In the plurality of braking modes, slopes of deceleration according to stroke of a brake pedal may be configured differently.

The vehicle state information may include at least one of brake pedal stroke information, brake pedal pressure information, engaged gear information, vehicle travelling speed information, and information on an inclination angle of a road surface on which the vehicle is located.

The condition determination unit may determine whether the preparation conditions are satisfied, based on at least one of a currently engaged gear, a travelling speed of the vehicle, and an inclination angle of a road surface on which the vehicle is located.

The conditions for changing the braking mode may include first changing conditions and second changing conditions, and the condition determination may determine whether the first changing conditions are satisfied by whether stroke of the brake pedal is equal to or greater than a predetermined level of pedal stroke, and may determine whether the second changing conditions are satisfied by whether a maintaining time for satisfying the first changing conditions is equal to or longer than a predetermined period of time.

The condition determination unit may further include a timer configured to count time, and the condition determination unit may initialize the timer when the preparation conditions are satisfied, and may update the maintaining time by counting the timer from the time at which the first changing conditions are satisfied.

The EMB device may include an EMB driving unit configured to receive electricity and to generate driving force; and a braking force generation unit configured to move by receiving the driving force and to generate braking force by pressing a brake disc, wherein the braking mode changing unit may control the EMB driving unit, and may generate vibrations by allowing the braking force generation unit to be in contact with the brake disc.

The EMB device may further include a returning unit in which the braking force generation unit may generate elastic restorative force in a direction away from the brake disc.

The returning unit may include a body unit coupled to a torque member supported by a vehicle body; and an elastic force generation unit configured to generate elastic restorative force such that the braking force generation unit may move away from the brake disc, protruding from and supported by the body unit, and in oblique contact with one surface of the braking force generation unit.

The braking mode changing unit may control the EMB driving unit, may move the braking force generation unit in a direction away from the brake disc for a predetermined first period of time, may move the braking force generation unit in a direction closer to the brake disc for a predetermined second period of time, and may allow the braking force generation unit to be in contact with the brake disc, and the second period of time may be configured to be shorter than the first period of time.

The device may further include a notification unit configured to visually or audibly notify a driver of a changed braking mode.

According to another aspect of the subject matter described in this application, a method of changing a braking mode in a vehicle including a plurality of braking modes includes receiving vehicle state information; determining whether conditions for preparation of changing the braking mode are satisfied, based on the vehicle state information; determining whether conditions for changing the braking mode are satisfied, based on the vehicle state information; changing the braking mode when the preparation conditions and the changing conditions are satisfied; and notifying a change in the braking mode, wherein the notifying a change in the braking mode includes notifying a change in the braking mode by generating vibrations by operating the electromechanical braking (EMB) device configured to generate braking force on the vehicle.

In the plurality of braking mode, slopes of deceleration according to stroke of a brake pedal may be configured differently.

The vehicle state information may include at least one of brake pedal stroke information, brake pedal pressure information, engaged gear information, information on a traveling speed of the vehicle, and information on an inclination angle of a road surface on which the vehicle is located.

The determining whether preparation conditions are satisfied may include determining whether the preparation conditions are satisfied, based on at least one of a currently engaged gear, a traveling speed of the vehicle, and an inclination angle of a road surface on which the vehicle is located.

The determining whether preparation conditions are satisfied may include determining whether the preparation conditions for changing the braking mode are satisfied through a condition determination unit including a timer, and preparing to change a braking mode to initialize the timer when it is determined that the preparation conditions are satisfied.

The determining whether conditions for changing the braking mode are satisfied may further include determining whether the conditions for changing the braking mode are satisfied through a condition determination unit including a timer; determining whether first changing conditions are satisfied; and determining whether the second changing conditions are satisfied using the timer.

The determining whether first changing conditions are satisfied may include determining whether the first changing conditions are satisfied, based on whether stroke of the brake pedal is equal to or greater than a predetermined pedal stroke, and the determining whether second changing conditions are satisfied may include determining whether the second changing conditions are satisfied, based on whether a maintaining time for satisfying the first changing conditions is equal to or longer than a predetermined period of time.

The determining whether first changing conditions are satisfied may include updating a maintaining time at which the first changing conditions are satisfied by counting the timer when it is determined that the first changing conditions are satisfied.

The method may further include notifying a driver of a changed braking mode.

DETAILED DESCRIPTION

Figure 1:
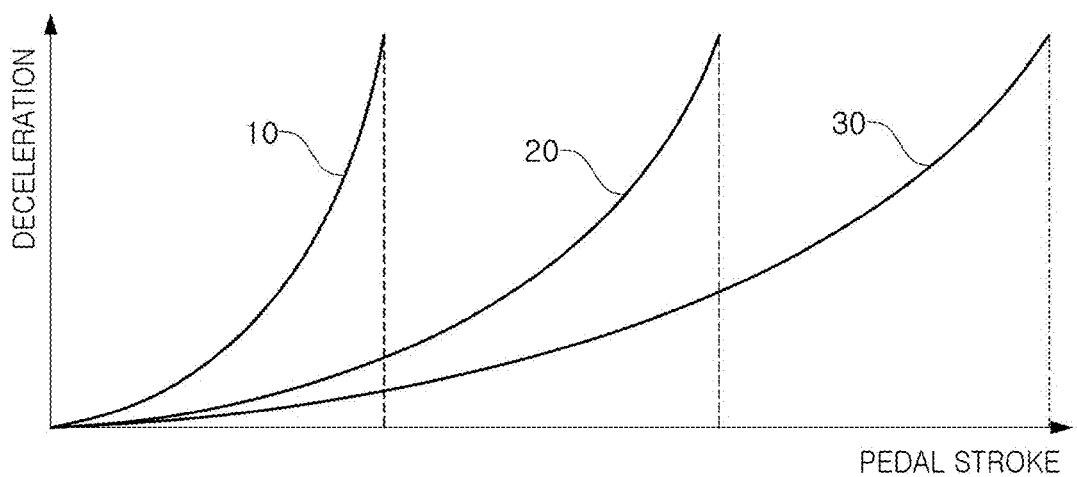
FIG. 1 is a diagram illustrating an example of a braking mode.

FIG. 1 is a diagram illustrating an example of a braking mode.

Referring to FIG. 1, a braking mode may include at least three braking modes.

One of the at least three braking modes may be referred to as a first braking mode 10, another braking mode may be referred to as a second braking mode 20, and another braking mode may be referred to as a third braking mode 30.

Referring to FIG. 1, the first to third braking mode 30 may be configured to form different slopes. That is, in the first to third braking mode 30, the braking diagram may be configured such that the magnitude of deceleration required by a driver corresponding to a pedal stroke may be different.

More specifically, in the first braking mode 10, an increase/decrease rate of deceleration in response to a change in pedal stroke input by the driver may be relatively greater than in the second braking mode 20 or the third braking mode 30. Also, in the first braking mode 10, the magnitude of deceleration required by a driver corresponding to the same pedal stroke may be relatively greater than that of the second braking mode 20 or the third braking mode 30.

Accordingly, in the first braking mode 10, the driver may generate relatively large braking force using relatively smaller pedal stroke than that of the second braking mode 20 or the third braking mode 30.

The second braking mode 20 may be configured to have a smaller increase/decrease rate of the braking diagram as compared to the first braking mode 10. The third braking mode 30 may be configured to have a smaller increase/decrease rate in the diagram than that of the second braking mode 20.

By braking by configuring the three braking modes, a driver may drive while feeling a difference in braking comfort according to each braking mode.

In some implementations, braking modes may not necessarily be limited to three modes, and three or more braking modes may be configured.

Also, FIG. 1 illustrates an example of deceleration required by a driver for pedal stroke, but the example may also be applied to deceleration required by a driver for pedal effort.

Figure 2:
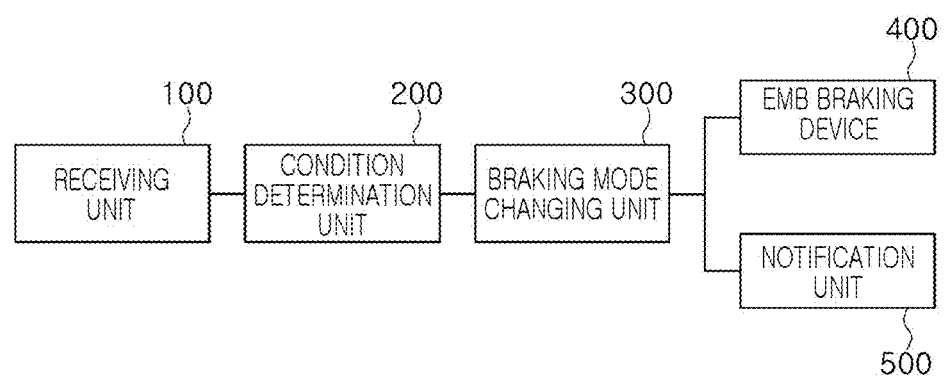
FIG. 2 is a block diagram illustrating an example of a device configured to change a braking mode.

FIG. 2 is a block diagram illustrating a device for changing a braking mode.

Referring to FIG. 2, a device for changing a braking mode may include a receiving unit 100, a condition determination unit 200, a braking mode changing unit 300, an electromechanical braking (EMB) device 400 and a notification unit 500.

The receiving unit 100 may receive information about a state of vehicle. For example, the receiving unit 100 may receive information on the state of vehicle including information on a magnitude of stroke of the brake pedal of the vehicle, engaged gear information, information on a traveling speed of the vehicle, information on an inclination angle of a road surface on which the vehicle is located, and information on whether each component is broken.

The receiving unit 100 may be connected to sensors provided in the vehicle using a network provided in the vehicle and may receive information about the driving state of the vehicle. For example, the receiving unit 100 may receive information on brake pedal stroke from the brake pedal sensor using a controller area network (CAN) of the vehicle.

The condition determination unit 200 may determine whether the preparation conditions for changing the braking mode are satisfied on the basis of the vehicle state information received from the receiving unit 100, and whether the changing conditions are satisfied when the preparation conditions are satisfied.

When the current gear of vehicle is in a parking gear (P gear), the driving speed is 0, and an inclination angle of a road surface on which the vehicle is located is equal to or less than the predetermined inclination angle, the condition determination unit 200 may determine that the preparation conditions are satisfied.

Here, the predetermined inclination angle may be configured in various manners depending on the type of vehicle.

When the preparation conditions are satisfied, the condition determination unit 200 may determine whether the conditions for changing the braking mode are satisfied.

The condition determination unit 200 may determine whether the first changing conditions and the second changing conditions satisfy the conditions for changing the braking mode.

Here, the first changing conditions may be related to stroke of the brake pedal value, and the second changing conditions may be related to a brake pedal pressing time.

Here, the condition determination unit 200 may further include a timer to determine the second changing conditions.

The condition determination unit 200 may initialize the timer when the preparation conditions are satisfied.

When the value of stroke of the brake pedal value satisfies the first changing conditions, the condition determination unit 200 may count the time using a timer.

When the counted time satisfies predetermined second changing conditions, the condition determination unit 200 may determine that the entirety of conditions for changing the braking mode are satisfied.

The braking mode changing unit 300 may change a currently determined braking mode. When the conditions for changing the braking mode are satisfied, the braking mode changing unit 300 may change the braking mode in a predetermined order. For example, the order may be the first braking mode 10->the second braking mode 20->the third braking mode 30->the first braking mode 10, but an implementation thereof is not limited thereto.

When changing the braking mode, the braking mode changing unit 300 may operate the EMB device 400 and may generate impact sounds and vibrations in the vehicle.

When changing the braking mode, by generating vibrations in the vehicle, a driver may be informed of a change in braking mode intuitively.

The notification unit 500 may inform the driver of the changed braking mode, that is, the state of current braking mode. The notification unit 500 may visually or audibly notify the driver of the braking mode.

The notification unit 500 may be a display for touch recognition (e.g., AVN (audio, video, navigation)), an instrument panel, or the like, included in a cluster of a vehicle, or may be an audio system provided in the vehicle.

For example, the notification unit 500 may display the current braking mode as a pop-up message on a display included in a cluster of the vehicle and may inform the driver of the current braking mode. Also, the braking mode of vehicle may be notified to the driver using an audio system of vehicle (e.g., "changed to the first braking mode 10," or the like).

The EMB device 400 may be mounted on an individual wheel provided in the vehicle and may generate braking force. Also, the EMB device 400 may generate sounds and vibrations in the vehicle.

Components of the device for changing a braking mode may be connected in a wired manner or wirelessly to exchange information. For example, data may be exchanged using Ethernet, media oriented systems transport (MOST), Flexray, controller area network (CAN), local interconnect network (LIN), Internet, LTE, 5G, Wi-Fi, Bluetooth, near field communication (NFC), Zigbee, radio frequency (RF).

Figure 3:
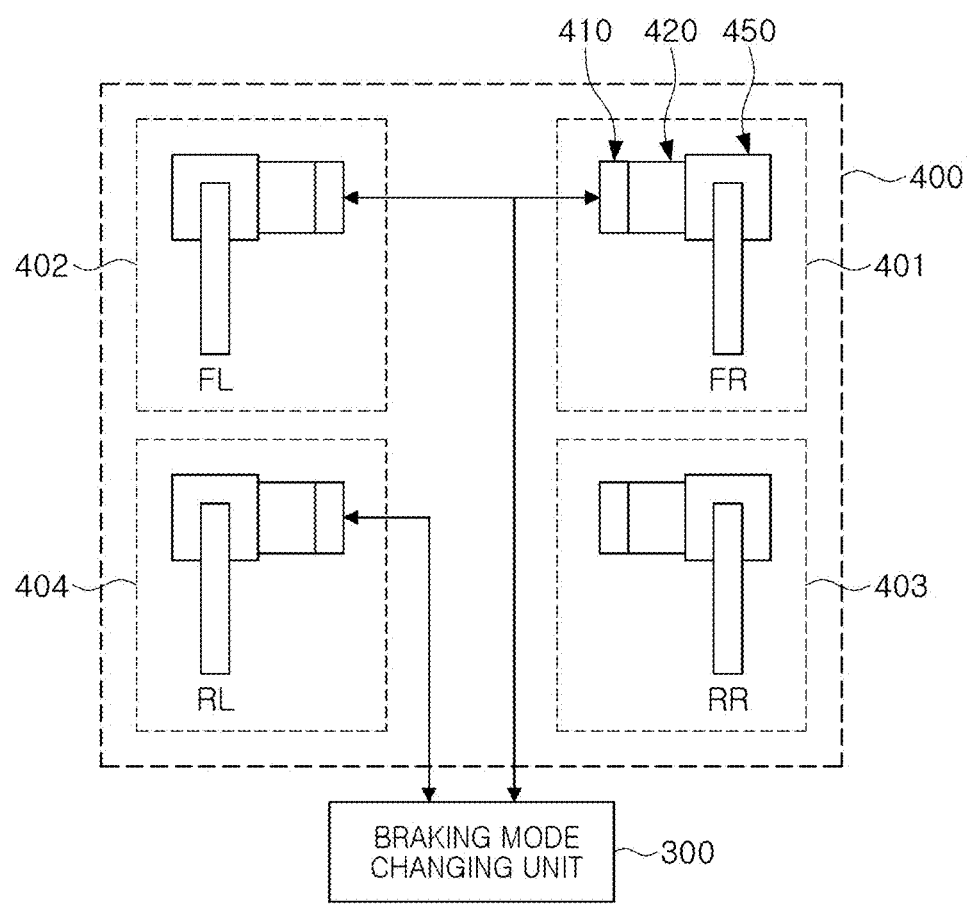
FIG. 3 is a diagram illustrating an example of an EMB braking system.
Figure 4A:
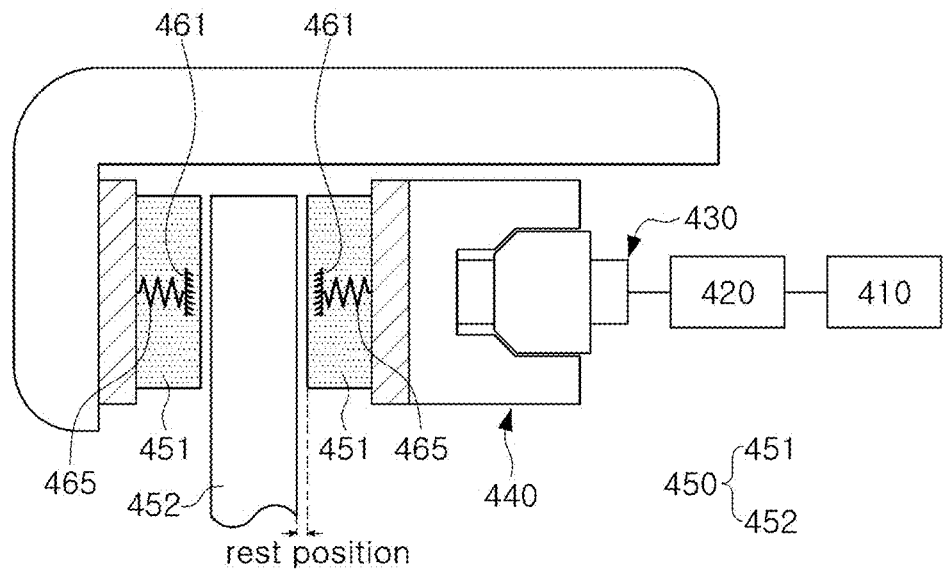
FIG. 4A is a diagram illustrating an exemplary process for generating sound and vibrations using an EMB device.
Figure 4B:
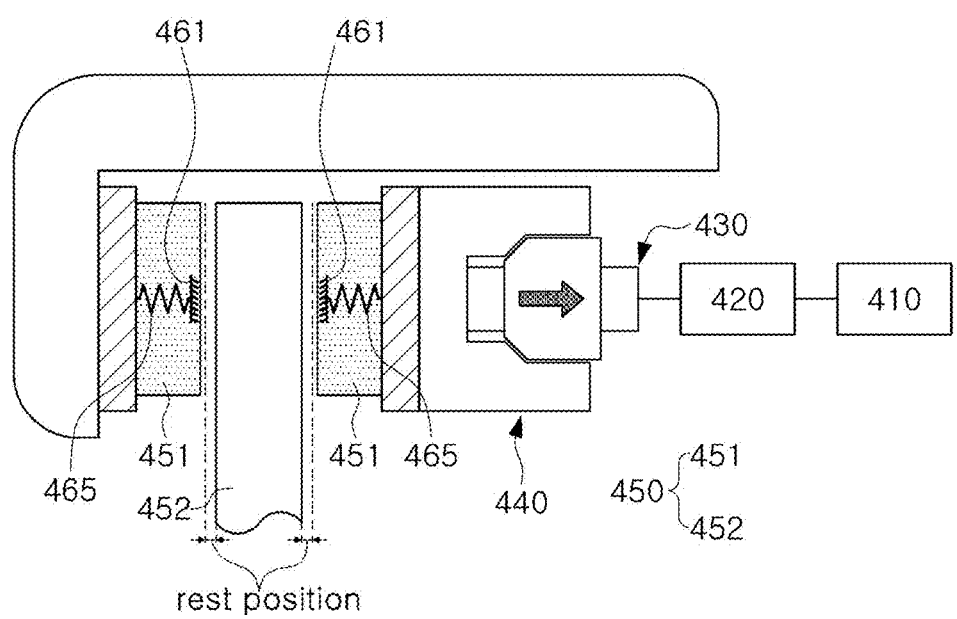
FIG. 4B is a diagram illustrating an exemplary process for generating sound and vibrations using an EMB device.
Figure 4C:
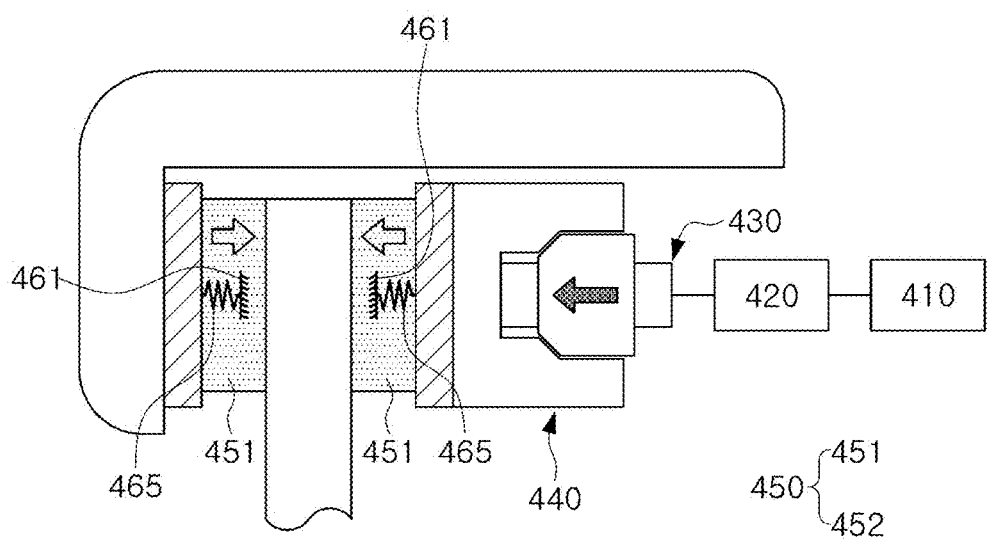
FIG. 4C is a diagram illustrating an exemplary process for generating sound and vibrations using an EMB device.

FIG. 3 is a diagram illustrating an EMB braking system. FIGS. 4A to 4C are diagrams illustrating a process for generating sound and vibrations using an EMB device.

Referring to FIGS. 3 and 4A to 4C, the EMB device 400 may be installed on each wheel mounted on the vehicle. Hereinafter, in some implementations, the first to fourth EMB devices 401, 402, 403, and 404 may be included with respect to a vehicle including four wheels, but an implementation thereof is not limited thereto, and the number of EMB devices 400 may be varied depending on the number of wheels the vehicle and the EMB braking system.

The braking mode changing unit 300, which will be described later, may be connected to the first to fourth EMB devices 401, 402, 403, and 404, respectively, and may control the first to fourth EMB devices 401, 402, 403, and 404.

Meanwhile, the first to fourth EMB devices 401, 402, 403, and 404 may include an EMB central controller, and the EMB central controller may be connected to the EMB controller 410, which is individually provided in the first to fourth EMB devices 401, 402, 403, and 404, and may individually control the first to fourth EMB devices 401, 402, 403, and 404.

Also, the EMB central controller may determine the braking force to be generated by each EMB based on information such as the amount of pedal stroke of vehicle, a wheel speed, a longitudinal acceleration, and a yaw while the vehicle is travelling.

Accordingly, in FIG. 3, the braking mode changing unit 300 may be connected to the EMB controller 410 individually provided in the first to fourth EMB devices 401, 402, 403, and 404, but an implementation thereof is not limited thereto, and the braking mode changing unit 300 may be connected to the EMB central controller, and may generate sound and vibrations by operating the first to fourth EMB devices 401, 402, 403, and 404 using the EMB central controller.

Referring to FIGS. 3 and 4A to 4C, the EMB device 400 may include an EMB controller 410, an EMB driving unit 420, a power transmission unit 430, a power conversion unit 440, and a braking force generation unit 450.

The EMB controller 410 may generate braking force or sound and vibrations in the EMB device by controlling the EMB driving unit 420 through a collision control unit or an EMB central controller.

The EMB driving unit 420 may provide driving force for generating braking force in the braking force generation unit 450. The EMB driving unit 420 may be configured as an actuator for receiving electricity and generating driving force. The EMB driving unit 420 may generate driving force through rotational movement generated by the actuator.

The power transmission unit 430 may receive driving force caused by the rotational movement of the EMB driving unit 420. The power transmission unit 430 may include a spindle, may be connected to the EMB driving unit 420 and may receive rotational energy from the EMB driving unit.

The power conversion unit 440 may convert driving force of rotational movement received by the power transmission unit 430 into linear movement. For example, the power conversion unit 440 may be configured as a ball screw. When the driving force of the rotational movement received from the power transmission unit 430 rotates the screw, the ball may move linearly along the screw.

Alternatively, the power conversion unit 440 may include a bolt rotating integrally with the spindle, a nut moving forward and backward according to the rotation of the bolt, and a piston moving with the nut.

One end of the power conversion unit 440 may be connected to the power transmission unit 430 for transmitting the driving force of rotational movement, and the other end may be connected to the braking force generation unit 450.

The braking force generation unit 450 may be connected to the power conversion unit 440, may move linearly, and may generate braking force by pressing the brake disc 452.

For example, the braking force generation unit 450 may include at least one brake pad 451. Also, the braking force generation unit 450 may be two brake pads 451 disposed opposite to each other with the brake disc 452 interposed therebetween.

The braking force generation unit 450 may generate braking force using the friction force generated when two brake pads 451 disposed opposite each other press the brake disc 452 in both directions.

In other words, the EMB driving unit 420 may generate rotational kinetic energy on the basis of the EMB controller 410, and the power transmission unit 430 may receive the rotational kinetic energy of the EMB driving unit 420 and transmit the energy to the power conversion unit 440. The power conversion unit 440 may convert the rotational kinetic energy of the EMB driving unit 420 received from the power transmission unit 430 into linear kinetic energy. The braking force generation unit 450 may generate braking force by moving the converted linear cloud energy and pressing the brake disc 452.

The EMB device 400 may further include a returning unit 460. The returning unit 460 may be configured to reduce contact drag between the braking force generation unit 450 and the brake disc 452 when braking is completed.

The returning unit 460 may allow the braking force generation unit 450 to fall stably together with the power conversion unit 440 from the brake disc 452 in a state in which the brake disc 452 of the braking force generation unit 450 is pressed.

Figure 5:
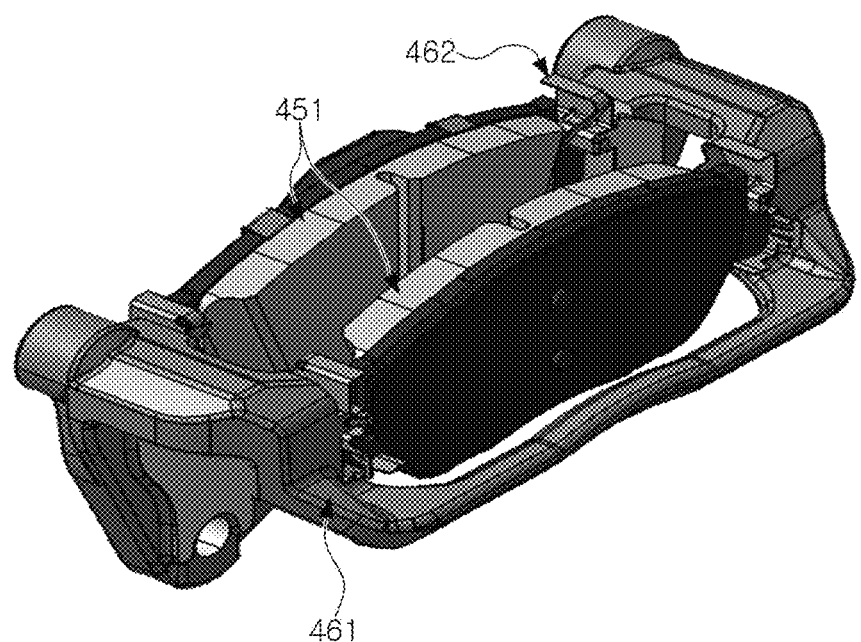
FIG. 5 is a perspective diagram illustrating an example of a returning unit of an EMB device.
Figure 6:
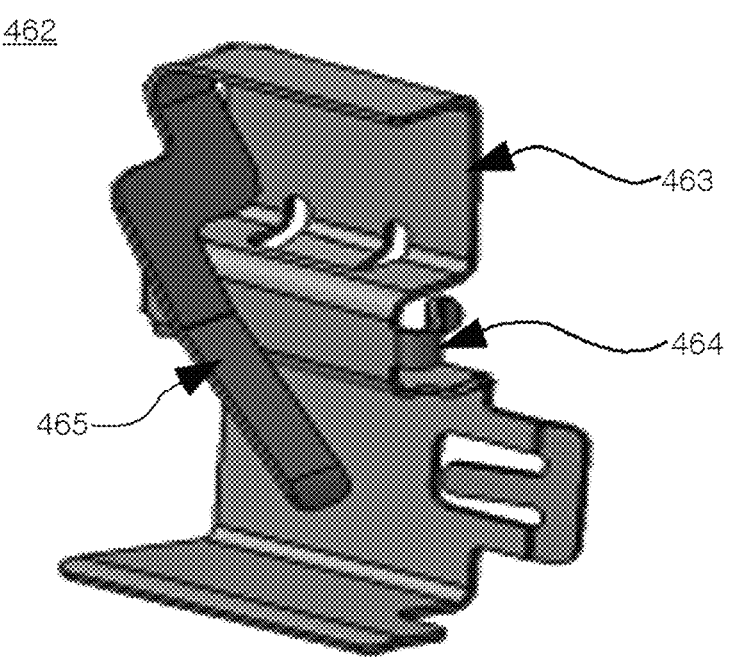
FIG. 6 is a perspective diagram illustrating an example of a pad liner.

FIG. 5 is a perspective diagram illustrating a returning unit of an EMB device. FIG. 6 is a perspective diagram illustrating a pad liner.

The returning unit 460 will be described in greater detail with reference to FIGS. 5 and 6.

Referring to FIG. 5, the returning unit 460 may include a torque member 461 fixed to and supported by a vehicle body by being coupled to a knuckle, and a pad liner 462 disposed between the torque member 461 and the brake pad 451 and fixed to and supported by the torque member 461.

Also, referring to FIG. 6, the pad liner 462 may include a body unit 463 coupled to the torque member 461, a guide portion 464 protruding from the body unit 463, inserted into a portion of the brake pad 451 and forming a movement path of the brake pad 451, and an elastic force generation unit 465 configured to generate elastic restorative force in a direction away from the brake disc 452 on the basis of the movement of the brake pad 451.

The elastic force generation unit 465 may be configured to protrude in a direction of from the body unit 463 to the brake pad 451, and may be in oblique contact with one surface of the brake pad 451 at an angle such that the brake pad 451 may move away from the brake disc 452.

The elastic force generation unit 465 may be formed of an elastic material, and may generate elastic restorative force in the direction of the brake pad 451 in the body unit 463.

When braking is completed, the brake pad 451 may be separated from the brake disc 452 and may return to an original position thereof due to the elastic force generation unit 465, and may prevent the dragging caused by the brake pad 451 contacting the brake disc 452.

The operation of the elastic force generation unit 465 will be described in greater detail.

When braking force occurs, the brake pad 451 may move in the direction of the brake disc 452 by driving force generated by the EMB driving unit 420, may press the brake disc 452 and may generate braking force.

Here, one side may be in contact with one surface of the brake pad 451, and the returning unit 460, which is fixed to the torque member 461, may be deformed as the brake pad 451 moves to the brake disc 452 and may generate elastic restorative force.

Accordingly, when braking is completed and the driving force generated by the EMB driving unit 420 applied to the brake pad 451 is removed, the brake pad 451 may move in a direction away from the brake disc 452 according to the elastic restorative force of the returning unit 460.

The process of generating sound and vibrations using the EMB device 400 may be described with reference to FIGS. 4A to 4C.

Referring to FIG. 4A, when the EMB device 400 does not generate braking force, a distance between the braking force generation unit 450 and the brake disc 452 may increase as much as a predetermined rest position in consideration of braking responsiveness and dragging.

Here, the EMB device 400 may directly sense the distance between the braking force generation unit 450 and the brake disc 452 and may adjust the distance between the braking force generation unit 450 and the brake disc 452.

Alternatively, the EMB device 400 may adjust the distance between the braking force generation unit 450 and the brake disc 452 by controlling the rotation of the motor included in the EMB driving unit 420 using a motor position sensor.

Referring to FIGS. 4B and 4C, when generating sound and vibrations using the EMB device 400, the EMB device 400 may allow the distance between the braking force generation unit 450 and the brake disc 452 to increase further than the rest position by controlling the EMB driving unit 420.

Also, the EMB device 400 may increase a forward speed of the braking force generation unit 450 by adjusting a current value applied to the EMB driving unit 420, and the braking force generation unit 450 may be in contact with the brake disc 452 at a strong speed, and impact sounds and vibrations may occur.

In particular, the EMB device 400 may rapidly move the braking force generation unit 450 while the distance between the braking force generation unit 450 and the brake disc 452 is greater than the rest position, which may generate larger impact sounds and vibrations.

The device for changing a braking mode may perform a braking mode change by pressing the brake pedal, such that the EMB device 400 may start operating while the brake disc 452 and the braking force generation unit 450 are in contact with each other.

Similarly, even when the brake disc 452 and the braking force generation unit 450 are in contact with each other, the EMB device 400 may increase the distance between the braking force generation unit 450 and the brake disc 452 further than the rest position by control the EMB driving unit 420 and may be in strongly contact with the brake disc 452 again.

Here, the distance between the braking force generation unit 450 and the brake disc 452 and the speed at which the braking force generation unit 450 becomes in contact the brake disc 452 may be adjusted.

For example, the distance between the braking force generation unit 450 that falls beyond the rest position and the brake disc 452 may be controlled by adjusting the operation time of the EMB driving unit 420, and the speed at which the braking force generation unit 450 is in contact with the brake disc 452 may be adjusted by controlling the current applied to the EMB driving unit 420.

Also, the braking mode changing unit 300 move the braking force generation unit 450 in a direction away from or closer to the brake disc 452 by controlling the EMB driving unit 420. In some implementations, since the brake disc 452 and the braking force generation unit 450 operate while being in contact with each other, sound and vibrations may be generated using the EMB device 400 by adjusting the operation time of the EMB driving unit 420.

For example, the braking mode changing unit 300 may allow the braking force generation unit 450 to move in a direction away from the brake disc 452 during a predetermined first period of time by controlling the EMB driving unit 420, to move during a predetermined second period of time and to be in contact with the brake disc 452.

Here, as the second period of time is configured to be shorter than the first period of time, the braking force generation unit 450 may be in strongly contact with the brake disc 452 and may generate larger sounds and vibrations.

Accordingly, by appropriately configuring the first period of time and the second period of time, the braking mode changing unit 300 may generate sounds and vibrations desired by the driver using the EMB device 400.

Also, a device for changing a braking mode may generate sound and vibrations by selecting a plurality of EMB devices 400 provided in a vehicle.

For example, in the case in which strong sound and vibrations are desired, the sound and vibrations may be strengthened by adjusting the configuring the EMB device as described above, or sound and vibrations may be strengthened by controlling the number of EMB devices 400 for generating sound and vibrations.

Alternatively, a portion of the EMB device 400 may generate braking force, and a portion of the EMB device 400 may generate sound and vibrations. Using a portion of the EMB device 400 for generating braking force, fine movements generated by vibrations of the EMB device may be prevented.

In some implementations, as described with reference to Table 1 below, by distinguishing the EMB device 400 of the front wheel and the EMB device 400 of the rear wheel from each other, the EMB device 400 of the front wheel may generate sound and vibrations, and the EMB device 400 of the rear wheel may generate braking force.

Table 1 lists the example of order of changing the braking mode, operation of the EMB device 400 and notification unit 500.

TABLE 1

| (a) Classification | (b) EMB device | | (c) | (d) |
| --- | --- | --- | --- | --- |
| | Front wheel EMB | Rear wheel EMB | Notification unit | Braking mode |
| State of release | Released | Released | — | Second braking mode |
| State of pedal pressed (preparation conditions or changing conditions satisfied X) | Pressed | Pressed | — | Second braking mode |
| State of pedal pressed (preparation conditions or changing conditions satisfied O) | Released (momentarily) → re-pressed | Pressed | Braking mode changing notification | Third braking mode |
| State of release | Released | Released | — | Third braking mode |
| State of pedal pressed (preparation conditions or changing conditions not satisfied X) | Pressed | Pressed | — | Third braking mode |
| State of pedal pressed (preparation conditions or changing conditions satisfied O) | Released (momentarily) → re-pressed | Pressed | Braking mode changing notification | First braking mode |

TABLE 1-continued

| (a) Classification | (b) EMB device | | (c) Notification unit | (d) Braking mode |
|---|---|---|---|---|
| | Front wheel EMB | Rear wheel EMB | | |
| State of release | Released | Released | — | First braking mode |
| State of pedal pressed (preparation conditions or changing conditions satisfied 0 | Pressed | Pressed | — | First braking mode |
| State of pedal pressed (conditions for changing the braking mode satisfied 0 | Released (momentarily) → re-pressed | pressed | braking mode changing notification | second braking mode |

Referring to Table 1, once the preparation conditions and conditions for changing the braking mode are satisfied, the braking mode may be changed according to a predetermined order.

For example, referring to column (d) of Table 1, when the current braking mode is the second braking mode 20, the mode may be changed to the third braking mode 30, when the current braking mode is the third braking mode 30, the mode may be changed to the first braking mode 10, and when the current braking mode is the first braking mode 10, the mode may be changed to the second braking mode 20.

Referring to column (b) of Table 1, the operating state of the EMB device 400 in each circumstance are indicated.

In the case of the state of release in which the brake pedal is not pressed, both the EMB device 400 on the front wheel and the EMB device 400 on the rear wheel may be in a released state.

Here, the released state may be a state in which the braking force generation unit 450 of the EMB device 400 and the brake disc 452 are not in contact with each other, and may be a standby state in which the braking force generation unit 450 is located in a safe position.

In the case in which the brake pedal is pressed but the first changing conditions and the second changing conditions are not satisfied, both the EMB device 400 on the front wheel and the EMB device 400 on the rear wheel may be in the pressed state.

Here, the pressed state may be a state in which the braking force generation unit 450 of the EMB device 400 and the brake disc 452 are in contact with each other.

When the brake pedal is pressed and the first changing conditions and second changing conditions are satisfied, the EMB device 400 on the front wheel may be momentarily released and re-pressed and may generate sound and vibrations, and the EMB device 400 of the rear wheel may be in the pressed state.

Here, when the EMB device 400 of the front wheel is momentarily released, the braking force generation unit 450 may be disposed further away from the brake disc 452 than from the position in the released state.

Also, when the EMB device 400 of the front wheel is re-pressed, the braking force generation unit 450 may be re-pressed at a high speed. More specifically, during re-pressing, the braking force generation unit 450 may move at a faster speed than the speed at which the braking force generation unit 450 moves in the pressed state when the brake pedal is pressed but the first changing conditions and second changing conditions are not satisfied.

Figure 7:
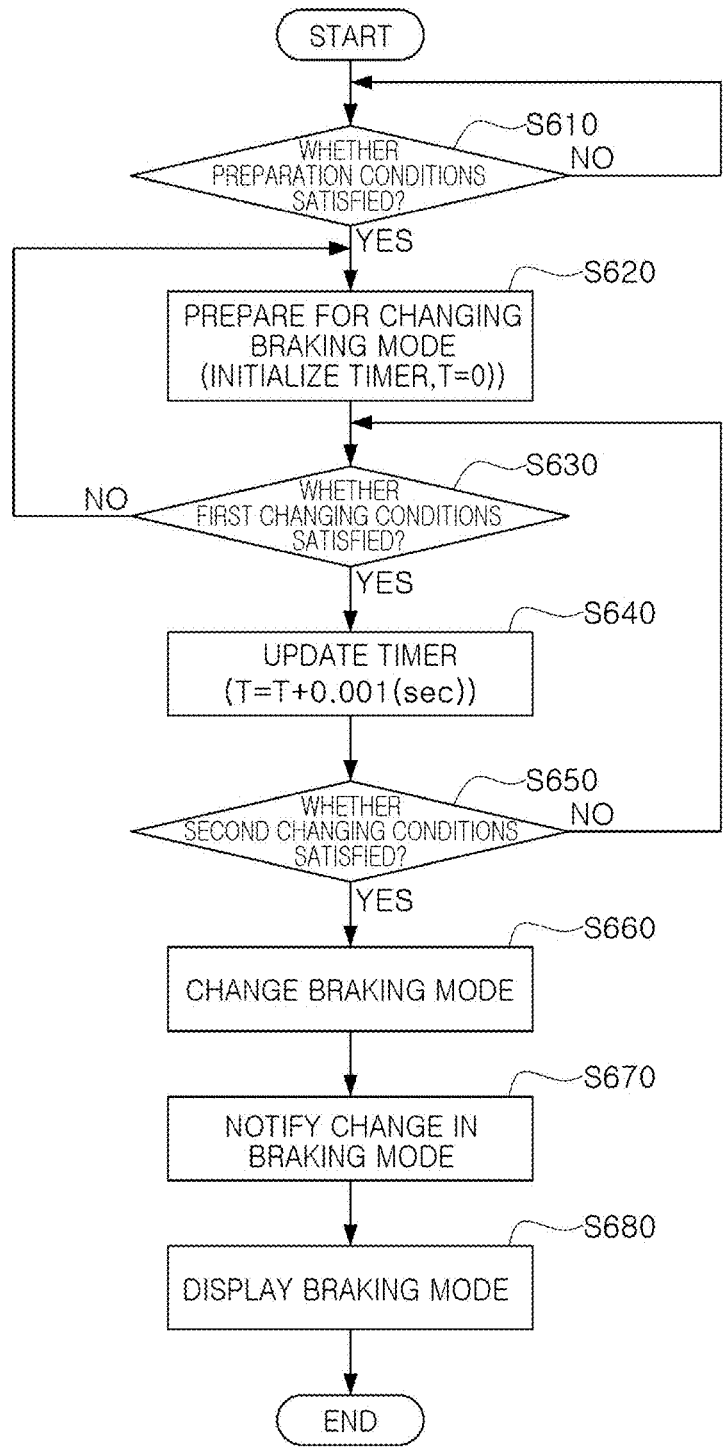
FIG. 7 is a flowchart illustrating an example of a method of changing a braking mode.

FIG. 7 is a flowchart illustrating a method of changing a braking mode.

Referring to FIG. 7, the method of changing a braking mode may determine whether preparation conditions are satisfied.

The condition determination unit 200 may determine whether preparation conditions for changing the braking mode are satisfied, based on vehicle information received from the receiving unit 100 (S610).

Here, when the current vehicle gear is in a parking gear (P gear), the vehicle is stopped (e.g., the driving speed is 0), and an inclination angle of a road surface on which the vehicle is located is within a predetermined inclination angle (for example, the inclination angle is within 0.5 degrees), the condition determination unit 200 may determine that preparation conditions are satisfied.

When the preparation conditions are satisfied, the braking mode changing unit 300 may perform preparing for changing the braking mode. The preparing for changing the braking mode may include initializing a timer included in the condition determination unit 200 (S620).

When the preparing for changing the braking mode is completed by initializing the timer, the condition determination unit 200 may determine whether the first changing conditions have been satisfied (S630).

Here, whether the first changing conditions are satisfied may be determined by comparing a stroke of the brake pedal with a predetermined stroke.

The condition determination unit 200 may determine that the first changing conditions are satisfied when the brake pedal stroke received through the receiving unit 100 is greater than the predetermined brake pedal stroke.

When the first changing conditions are not satisfied, the mode may return to the preparing for changing the braking mode, the timer may be initialized, and it may be determined whether the first changing conditions have been satisfied.

When the first changing conditions are satisfied, the maintaining time in which the first changing conditions are satisfied may be updated by counting the timer included in the condition determination unit 200 (S640).

Here, the maintaining time may be updated by additionally counting a predetermined period of time (for example, 0.001 seconds) from the previous maintaining time counted in the timer.

When the timer is updated, the condition determination unit 200 may determine whether the second changing conditions have been satisfied (S650).

Here, whether the second changing conditions are satisfied may be determined by comparing the updated maintaining time of the timer with the predetermined period of time.

When the maintaining time of the updated timer is less than the predetermined period of time, the condition determination unit 200 may repeatedly perform operation S630 and operation S640 and may repeatedly update the maintaining time of the timer.

When the maintaining time of the updated timer is lengthened further than the predetermined period of time, the condition determination unit 200 may change the braking mode (S660).

The condition determination unit 200 may perform operation S620 again in which the timer is initialized when operation S630 is not satisfied in the process of repeatedly performing operation S630 and operation S640 in the case in which the maintaining time of the updated timer is less than the predetermined period of time.

When the braking mode is changed, the braking mode changing unit 300 may generate sound and vibrations using the EMB device 400, thereby informing the driver riding in the vehicle that the braking mode has changed (S670).

The method of changing a braking mode may intuitively inform the driver of the change in braking mode using the vibrations of the vehicle.

Also, the notification unit 500 may inform the driver of the changed braking mode using sound or a display (680).

For example, the changed braking mode may be notified to the driver by displaying a pop-up message saying "changed to second braking mode" on a display included in the cluster.

Alternatively, the changed braking mode may be notified to the driver by generating a voice message saying "changed to second braking mode" using the audio system provided in the vehicle.

In some implementations, the device for changing a braking mode and the method of changing a braking mode may, by sensing operation of the brake pedal under predetermined conditions and changing the braking mode, allow a driver to change the braking mode conveniently.

Also, using the device for changing a braking mode and the method of changing a braking mode, when the braking mode is changed, by generating vibrations using the EMB device 400, the driver may feel changes in the braking mode by vibrations, such that the driver may recognize changes in braking mode more directly and intuitively.

Also, the device for changing a braking mode and the method of changing a braking mode may be implemented using components including the EMB device 400 provided in a general vehicle, such that the device and the method may be implemented without increasing cost and weight, which may be advantageous.

Methods according to implementations may be implemented in the form of program instructions executed through various computer means and may be written on a computer-readable medium. A computer-readable medium may include program instructions, data files, data structures, and the like, alone or in combination thereof. Program instructions written on a computer-readable medium may be specially designed and configured for the implementations or may be known and usable by those skilled in the art of computer software.

Examples of the computer-readable medium may include hardware devices specially configured to store and execute program instructions, such as ROM, RAM, flash memory, or the like. Examples of program instructions may include machine code created by a compiler and also a high-level language code executed by a computer using an interpreter. The above-described hardware device may be configured to operate with at least one software module to perform the operations in the implementations, or vice versa.

What is claimed is:

1. A device configured to change a braking mode of a vehicle, the device comprising:
    a receiver configured to receive vehicle state information;
    a condition determination unit, implemented using one or more computing devices, configured to determine whether one or more conditions for preparing to change the braking mode and one or more conditions for changing the braking mode are satisfied, based on the vehicle state information;
    an electromechanical braking (EMB) device configured to generate braking force on the vehicle; and
    a braking mode changing unit, implemented using one or more computing devices, configured to, based on a determination that the one or more conditions for preparing to change the braking mode and the one or more conditions for changing the braking mode are satisfied, change the braking mode,
    wherein the braking mode changing unit is configured to, based on the braking mode being changed, generate vibrations through the EMB device,
    wherein the EMB device includes:
        an EMB driver configured to receive electricity and generate a driving force, and
        a braking force generator configured to move based on the driving force being received and to generate braking force based on a brake disc being pressed, and wherein the braking mode changing unit is configured to:
        control the EMB driver, and
        generate the vibrations by allowing the braking force generator to come into contact with the brake disc.

2. The device of claim 1, wherein the vehicle is configured to perform a plurality of braking modes, and, within the plurality of braking modes, deceleration slopes, which vary based on a stroke of a brake pedal, are configured differently.

3. The device of claim 1, wherein the vehicle state information includes at least one of brake pedal stroke information, brake pedal pressure information, engaged gear information, vehicle travelling speed information, or information regarding an inclination angle of a road surface on which the vehicle is located.

4. The device of claim 1, wherein the condition determination unit is configured to determine whether the one or more conditions for preparing to change the braking mode are satisfied, based on at least one of a currently engaged gear, a travelling speed of the vehicle, or an inclination angle of a road surface on which the vehicle is located.

5. The device of claim 1,
    wherein the one or more conditions for changing the braking mode include one or more first changing conditions and one or more second changing conditions, and
    wherein the condition determination unit is configured to:
    determine whether the one or more first changing conditions are satisfied based on a stroke of a brake pedal being equal to or greater than a predetermined level of pedal stroke, and determine whether the one or more second changing conditions are satisfied based on maintaining time for satisfying the one or more first changing conditions being equal to or greater than a predetermined period of time.

6. The device of claim 5,
wherein the condition determination unit includes a timer configured to count time, and
wherein the condition determination unit is configured to, based on the one or more conditions for preparing to change the braking mode being satisfied, initialize the timer, and update the maintaining time by counting the timer from time at which the one or more first changing conditions are satisfied.

7. The device of claim 1, wherein the EMB device further includes a restoring member returning unit in which the braking force generator generates an elastic restorative force in a direction away from the brake disc.

8. The device of claim 7, wherein the restoring member includes:
a body coupled to a torque member supported by a vehicle body; and
an elastic force generator configured to generate an elastic restorative force such that the braking force generator moves away from the brake disc, protruding from and supported by the body, and in oblique contact with a first surface of the braking force generator.

9. The device of claim 1,
wherein the braking mode changing unit is configured to: control the EMB driver,
move the braking force generator in a direction away from the brake disc for a predetermined first period of time,
move the braking force generator in a direction closer to the brake disc for a predetermined second period of time, and
allow the braking force generator to be in contact with the brake disc, and
wherein the predetermined second period of time is configured to be less than the predetermined first period of time.

10. The device of claim 1, further comprising:
a notification unit configured to visually or audibly notify a driver of a changed braking mode.

11. A method of changing a braking mode in a vehicle, the method comprising:
receiving vehicle state information;
determining whether one or more conditions for preparing to change the braking mode are satisfied, based on the vehicle state information;
determining whether one or more conditions for changing the braking mode are satisfied, based on the vehicle state information;
changing the braking mode based on the one or more conditions for preparing to change the braking mode and the one or more conditions for changing the braking mode being satisfied; and
notifying a change in the braking mode,
wherein notifying the change in the braking mode includes generating vibrations by operating an electro-mechanical braking (EMB) device configured to generate a braking force on the vehicle,
wherein the EMB device includes:
an EMB driver configured to receive electricity and generate a driving force; and
a braking force generator configured to move based on the driving force being received and to generate braking force based on a brake disc being pressed,
wherein notifying a change in the braking mode includes allowing braking mode changing unit to generate the vibrations by allowing the braking force generator to come into contact with the brake disc.

12. The method of claim 11, wherein the vehicle is configured to perform a plurality of braking modes, and, within the plurality of braking modes, deceleration slopes, which vary based on a stroke of a brake pedal, are configured differently.

13. The method of claim 11, wherein the vehicle state information includes at least one of brake pedal stroke information, brake pedal pressure information, engaged gear information, information regarding a traveling speed of the vehicle, or information regarding an inclination angle of a road surface on which the vehicle is located.

14. The method of claim 11, wherein the determining whether the one or more conditions for preparing to change the braking mode are satisfied includes determining whether the one or more conditions for preparing to change the braking mode are satisfied, based on at least one of a currently engaged gear, a traveling speed of the vehicle, or an inclination angle of a road surface on which the vehicle is located.

15. The method of claim 11, wherein determining whether the one or more conditions for changing the braking mode are satisfied includes determining whether the one or more conditions for changing the braking mode are satisfied through a condition determination unit (i) including a timer and (ii) configured to, based on the one or more conditions for preparing to change the braking mode being satisfied, initialize the timer.

16. The method of claim 11, wherein determining whether the one or more conditions for changing the braking mode are satisfied further includes:
determining whether the one or more conditions for changing the braking mode are satisfied through a condition determination unit including a timer,
determining whether one or more first changing conditions are satisfied; and
determining whether one or more second changing conditions are satisfied using the timer.

17. The method of claim 16,
wherein determining whether the one or more first changing conditions are satisfied includes determining whether the one or more first changing conditions are satisfied based on a stroke of a brake pedal being equal to or greater than a predetermined pedal stroke, and
wherein determining whether the one or more second changing conditions are satisfied includes determining whether the one or more second changing conditions are satisfied, based on maintaining time for satisfying the one or more first changing conditions being equal to or greater than a predetermined period of time.

18. The method of claim 16, wherein determining whether the one or more first changing conditions are satisfied includes updating maintaining time at which the one or more first changing conditions are satisfied by counting the timer based on a determination that the one or more first changing conditions are satisfied.

19. The method of claim 11, further including:
notifying a driver of a changed braking mode.

* * * * *